(12) United States Patent
Sartori et al.

(10) Patent No.: US 10,085,228 B2
(45) Date of Patent: Sep. 25, 2018

(54) SYSTEM AND METHOD FOR DEVICE-TO-DEVICE COMMUNICATIONS

(71) Applicant: Futurewei Technologies, Inc., Plano, TX (US)

(72) Inventors: Philippe Sartori, Plainfield, IL (US); Anthony C. K. Soong, Plano, TX (US); Hossein Bagheri, Urbana, IL (US); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 393 days.

(21) Appl. No.: 14/596,898

(22) Filed: Jan. 14, 2015

(65) Prior Publication Data

US 2015/0201392 A1    Jul. 16, 2015

Related U.S. Application Data

(60) Provisional application No. 61/927,347, filed on Jan. 14, 2014.

(51) Int. Cl.
| | | |
|---|---|---|
| *H04W 60/00* | (2009.01) | |
| *H04W 74/08* | (2009.01) | |
| *H04W 72/12* | (2009.01) | |
| *H04W 8/00* | (2009.01) | |
| H04W 76/14 | (2018.01) | |
| H04W 74/02 | (2009.01) | |

(52) U.S. Cl.
CPC ........... *H04W 60/00* (2013.01); *H04W 8/005* (2013.01); *H04W 72/12* (2013.01); *H04W 74/0808* (2013.01); *H04W 74/02* (2013.01); *H04W 76/14* (2018.02)

(58) Field of Classification Search
CPC . H04W 60/00; H04W 8/005; H04W 74/0808; H04W 72/12
See application file for complete search history.

(56) References Cited

U.S. PATENT DOCUMENTS

| | | |
|---|---|---|
| 2002/0131363 A1 | 9/2002 | Beshai et al. |
| 2011/0040888 A1 | 2/2011 | Krishnaswamy et al. |
| 2011/0258313 A1 | 10/2011 | Mallik et al. |

(Continued)

OTHER PUBLICATIONS

"3rd Generation Partnership Project; Technical Specification Group Services and System Aspects; Feasibility study for Proximity Services (ProSe) (Release 12)," 3GPP TR 22.803, V12.0.0, Dec. 2012, 40 pgs.

(Continued)

*Primary Examiner* — Khaled Kassim
*Assistant Examiner* — Syed S Ali
(74) *Attorney, Agent, or Firm* — Slater Matsil, LLP (57) ABSTRACT

A method for device-to-device (D2D) communication includes determining that a first user equipment (UE) is out-of-coverage, the first UE having been previously in-coverage on a first cell. The method also includes starting a timer upon determining that the first UE is out-of-coverage and determining whether the first UE has returned to be in-coverage after starting the timer. Additionally, the method includes determining whether the timer has expired and communicating, by the first UE directly with a second UE, using out-of-coverage resources from the first cell when the timer has not expired and the first UE has not returned to be in-coverage.

20 Claims, 9 Drawing Sheets

(56) References Cited

U.S. PATENT DOCUMENTS

| | | | |
|---|---|---|---|
| 2012/0155273 A1 | 6/2012 | Hughes et al. | |
| 2012/0195202 A1 | 8/2012 | Shatzkamer et al. | |
| 2012/0300712 A1 | 11/2012 | Hakola et al. | |
| 2013/0324114 A1 | 12/2013 | Raghotharnan et al. | |
| 2014/0050203 A1* | 2/2014 | Doppler | H04W 16/14 370/336 |
| 2015/0117309 A1* | 4/2015 | Gage | H04W 8/005 370/328 |
| 2015/0201392 A1* | 7/2015 | Sartori | H04W 60/00 370/329 |
| 2016/0050667 A1* | 2/2016 | Papasakellariou | H04W 74/0808 370/329 |
| 2016/0242144 A1* | 8/2016 | Adachi | H04W 72/04 |
| 2017/0034851 A1* | 2/2017 | Kwon | H04W 74/0808 |
| 2017/0041971 A1* | 2/2017 | Kim | H04W 76/14 |
| 2017/0086214 A1* | 3/2017 | Kalhan | H04W 76/14 |
| 2017/0118765 A1* | 4/2017 | Kalhan | H04W 76/14 |
| 2017/0230839 A1* | 8/2017 | Cui | H04W 16/14 |

OTHER PUBLICATIONS

"3rd Generation Partnership Project; Technical Specification Group Services and System Aspects; Feasibility study for Proximity Services (ProSe) (Release 12)," 3GPP TR 22.803, V12.2.0, Jun. 2013, 45 pgs.

"3rd Generation Partnership Project; Technical Specification Group Radio Access Network; Evolved Universal Terrestrial Radio Access (E-UTRA); User Equipment (UE) procedures in idle mode (Release 11)," 3GPP TS 36.304, V11.5.0. Sep. 2013, 34 pgs.

"3rd Generation Partnership Project; Technical Specification Group Radio Access Network; Evolved Universal Terrestrial Radio Access (E-UTRA); User Equipment (UE) procedures in idle mode (Release 12)," 3GPP TS 36.304, V12.2.0, Sep. 2014, 37 pgs.

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 12)," 3GPP TS 36.305, V12.1.0, Jun. 2014, 59 pgs.

"On Out of Coverage Definitions for D2D," Ericsson, 3GPP TSG RAN WG1 Meeting #75, R1-135809, Nov. 11-15, 2013, 4 pages.

"LTE; Evolved Universal Terrestrial Radio Access (E-UTRA); User Equipment (UE) Radio Transmission and Reception (3GPP TS 36.101 version 12.50 Release 12)" ETSI TS 136 101 V12.5.0, Nov. 2014, 538 pgs.

International Search Report and Written Opinion, International Application No. PCT/US2014/064671, Huawei Technologies Co., Ltd., dated Feb. 23, 2015, 9 pages.

International Search Report and Written Opinion of Patent Cooperation Treaty (PCT), International Application No. PCT/US15/11452, Applicant Huawei Technologies Co., Ltd., dated Apr. 10, 2015, 6 pages.

* cited by examiner

SYSTEM AND METHOD FOR DEVICE-TO-DEVICE COMMUNICATIONS

This application claims the benefit of U.S. Provisional Application Ser. No. 61/927,347 filed on Jan. 14, 2014, and entitled "System and Method for Device-to-Device Communication Protocol," which application is hereby incorporated herein by reference.

TECHNICAL FIELD

The present invention relates to a system and method for wireless communications, and, in particular, to a system and method for device-to-device communications.

BACKGROUND

Device-to-device (D2D) technology is expanding because of its ability to offer new services, improve system throughput, and offer a better user experience. D2D technologies include discovery and communication. In discovery, a user equipment (UE) attempts to discover neighboring UEs, either on its own or directed by an enhanced Node B (eNB). In communication, one UE directly communicates with another UE without the data transiting through the eNB.

SUMMARY

An embodiment method for device-to-device (D2D) communication includes determining that a first user equipment (UE) is out-of-coverage, the first UE having been previously in-coverage on a first cell. The method also includes starting a timer upon determining that the first UE is out-of-coverage and determining whether the first UE has returned to be in-coverage after starting the timer. Additionally, the method includes determining whether the timer has expired and communicating, by the first UE directly with a second UE, using out-of-coverage resources from the first cell when the timer has not expired and the first UE has not returned to be in-coverage.

An embodiment method for device-to-device (D2D) communications includes computing an in-coverage threshold (ICT) parameter and determining whether to perform contention-based resource allocation or scheduling-based resource allocation in accordance with the ICT parameter. The method also includes performing contention-based resource allocation to produce allocated resources when determining to perform contention-based resource allocation and performing scheduling-based resource allocation to produce the allocated resources when determining to perform scheduling-based resource allocation. Additionally, the method includes communicating, by a first user equipment (UE) directly with a second UE using the allocated resources.

An embodiment first user equipment (UE) includes a processor and a non-transitory computer readable storage medium storing programming for execution by the processor. The programming includes instructions to determine that the first UE is out-of-coverage, the first UE having been previously in-coverage on a first cell. The programming also includes instructions to start a timer upon determining that the first UE is out-of-coverage and determine whether the first UE has returned to be in-coverage after starting the timer. Additionally, the programming includes instructions to determine whether the timer has expired and communicate, directly with a second UE, using out-of-coverage resources from the first cell when the timer has not expired and the first UE has not returned to be in-coverage.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Two device-to-device (D2D) technologies are discovery and communication. In discovery, a user equipment (UE) attempts to discover neighboring UEs, either on its own or directed by a communications controller, such as an enhanced Node B (eNB). In communication, one UE directly communicates with another UE without the data transiting through the eNB. One issue in D2D communications is resource allocation. Resource allocation may be performed for UEs engaged in D2D communication, whether they are in network coverage or out of network coverage.

Resource allocation may be contention-based or scheduling based. In scheduling-based resource allocation, an eNB determines the resource allocation, while in contention-based resource allocation, the UEs contend (compete) for the use of the resources.

Figure 1:
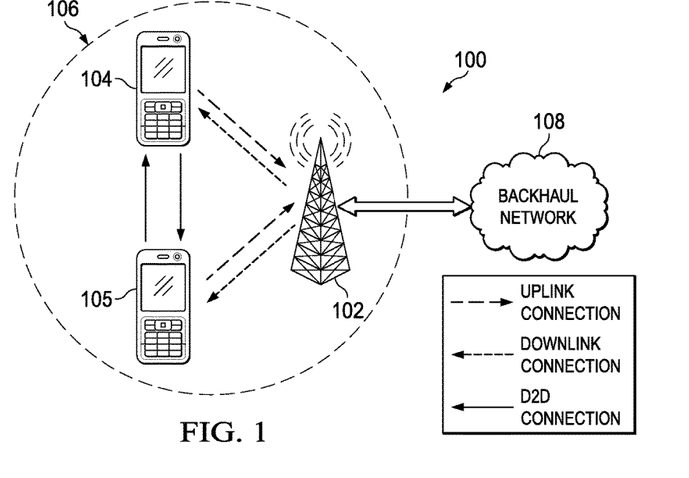
FIG. 1 illustrates a diagram of a wireless network for communicating data.

FIG. 1 illustrates network 100 for communicating data. Network 100 includes communications controller 102 having a coverage area 106, a plurality of UEs, including UE 104 and UE 105, and backhaul network 108. Two UEs are depicted, but many more may be present. Communications controller 102 may be any component capable of providing wireless access by establishing uplink (dashed line) and/or downlink (dotted line) connections with UE 104 and UE 105, such as a base station, a NodeB, an eNB, an access point, a picocell, a femtocell, and other wirelessly enabled devices. There may be D2D communication between UE 104 and UE 105. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc.

Figure 2:
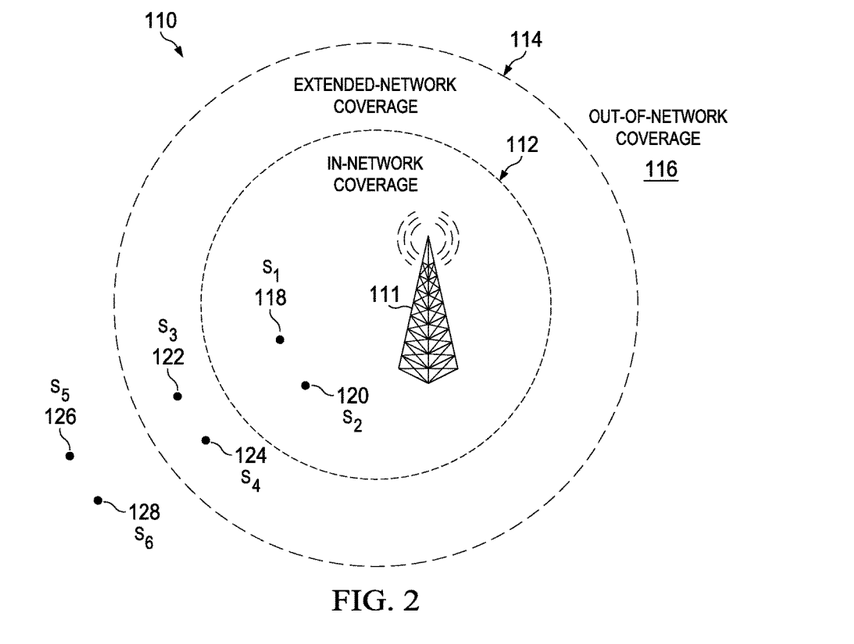
FIG. 2 illustrates coverage scenarios for user equipments (UEs)

The locations of UEs relative to the eNB may affect the coverage. FIG. 2 illustrates system 110 with eNB 111. In in-network coverage area 112, UEs, such as UE 118 and UE 120, are able to transmit messages to eNB 111 and receive messages from eNB 111. In out-of-network coverage area 116, UEs, such as UE 126 and UE 128, cannot communicate with eNB 111 at all. On the other hand, in area 114, also known as partial coverage area or edge of network, UEs, such as UE 122 and UE 124 can receive messages from eNB 111 but cannot transmit messages to eNB 111. In another partial coverage scenario, of two UEs performing D2D communication, one UE is located in-network coverage and the other UE is out-of-network coverage or has partial coverage.

Two approaches to D2D are a device-centric approach and a network-managed approach. In a device-central approach, the functionality for D2D resides mostly on the UEs with minimal network involvement, and direct communications between devices forms an overlay on top of the cellular network. Functions such as resource allocation and management are performed in an ad-hoc manner between the UEs without network oversight or management, limiting the potential performance gains from D2D and introducing challenges for supporting some functions of the cellular network. Some challenges include the security of user data and protecting user identity and/or location from being discovered by unauthorized parties, charging for D2D and proximity as a service, supporting lawful intercept of communications, and the scalability to different deployment scenarios and device densities.

In a network-managed approach, D2D complements and enhances the capabilities of the network for more efficient utilization of radio resources for proximate communications. The network may constantly supervise the usage of direct versus infrastructure routing of user data to achieve efficient utilization of resources, minimize interference, and benefit the network. Features of the cellular network may be extended to support D2D with a network-managed approach.

Two resource management schemes include scheduling-based resource allocation and contention-based resource allocation. In scheduling-based resource allocation, a central controller, such as an eNB, allocates resources to each UE. The process may be similar to how a cellular communication is scheduled. The UE may us a random access channel (RACH) or another contention-based channel to request resources. The central controller allocates resources and transmits the resource allocation on a control channel which may be similar to a physical downlink control channel (PDCCH) or an enhanced PDCCH (ePDCCH).

In contention-based resource allocation, a central controller is not used. Each UE attempts to obtain the channel and schedules its own resources for its transmission. A resource allocation protocol such as carrier sensing multiple access (CSMA) may be used.

Figure 3:
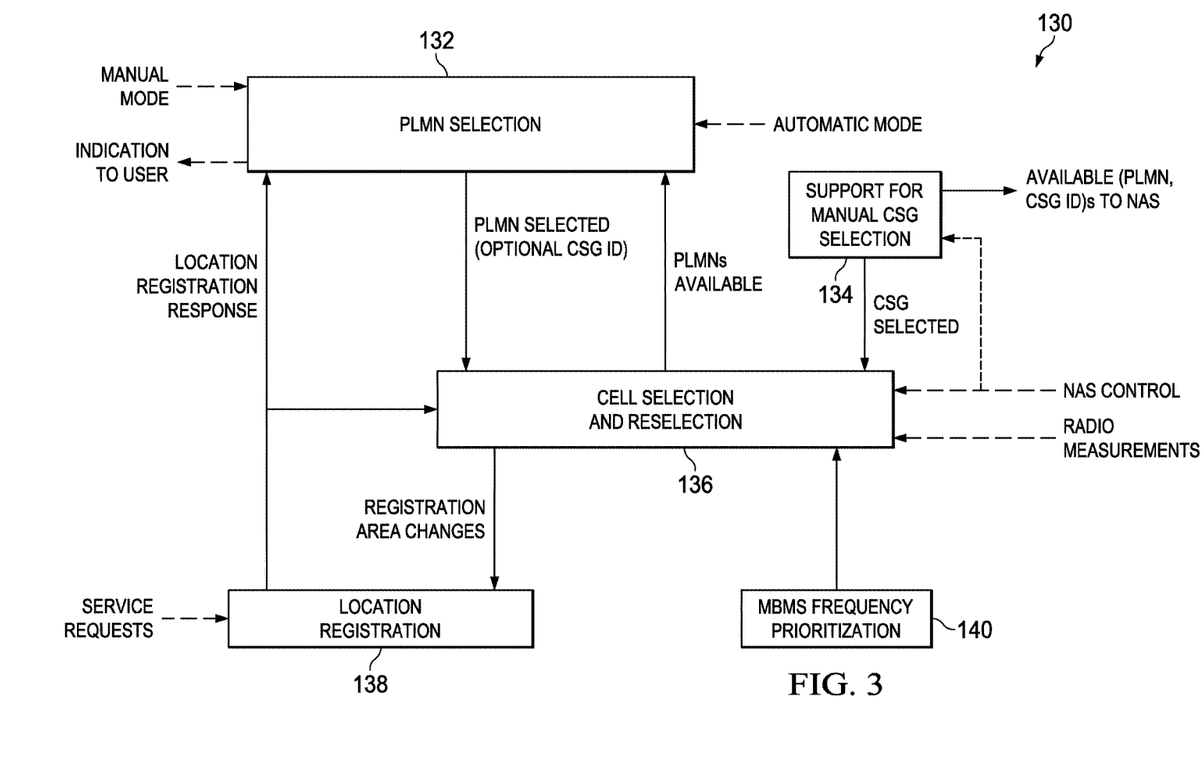
FIG. 3 illustrates an idle mode state diagram.

A UE in idle mode may perform processes such as public land mobile network (PLMN) selection, cell selection and reselection, location registration, and support for manual closed subscriber group (CSG) selection. FIG. 3 illustrates state diagram 130 for idle mode processes. When a UE is switched on, PLMN selection is performed by the non-access stratum (NAS) in the PLMN selection state 132. For the selected PLMN, associated radio access technology (RAT)(s) may be selected. The NAS provides a list of equivalent PLMNs. After PLMN selection, the UE proceeds to cell selection and reselection state 136.

The access stratum (AS) uses the list of equivalent PLMNs in cell selection and reselection state 136. The UE searches for a suitable cell for the selected PLMN, and chooses the selected cell to provide available services. Also, the UE tunes to its control channel. This selection is known as camping on the cell.

When the registration area changes, the UE registers its presence using a NAS registration procedure in the tracking area of the chosen cell in location registration state 138. As a result of a successful location registration, the selected PLMN becomes the registered PLMN, and the UE proceeds to the cell selection and reselection state 136. When the location registration is rejected by the network, the UE may return to the PLMN selection state 132, and select another PLMN when applicable.

When the UE finds a more suitable cell in accordance with the cell selection criteria, the UE reselects that cell and camps on it. When the new cell does not belong to at least one tracking area to which the UE is registered, location registration is performed.

The UE may search for higher priority PLMNs at regular intervals. The UE searches for a suitable cell when another PLMN has been selected by NAS.

A search of CSGs may be triggered by NAS in support CSG selection state 134.

When the UE loses coverage from the registered PLMN, either a new PLMN is selected automatically in automatic mode, or an indication of available PLMNs is given to the user, so that a manual selection may be performed in manual mode.

In multimedia broadcast multimedia service (MBMS) frequency prioritization state 140 is performed and MBMS frequencies are prioritized.

Camping on a cell in idle mode entails a variety of functions. It facilitates the UE receiving system information from the PLMN. Also, when a registered UE wants to establish a radio resource control (RRC) connection, it may do so by initially accessing the network on the control channel of the cell on which it is camped. When the PLMN receives a call for the registered UE, it usually knows the set of tracking areas in which the UE is camped. It may then send a paging message for the UE on the control channels of all the cells in this set of tracking areas. The UE then receives the paging message because it is tuned to the control channel of a cell in one of the registered tracking areas, and the UE may respond on that control channel.

When the UE is unable to find a suitable cell to camp on, or when the location registration fails, it may attempt to camp on a cell irrespective of the PLMN identity, and enter a limited service state.

Figure 4A:
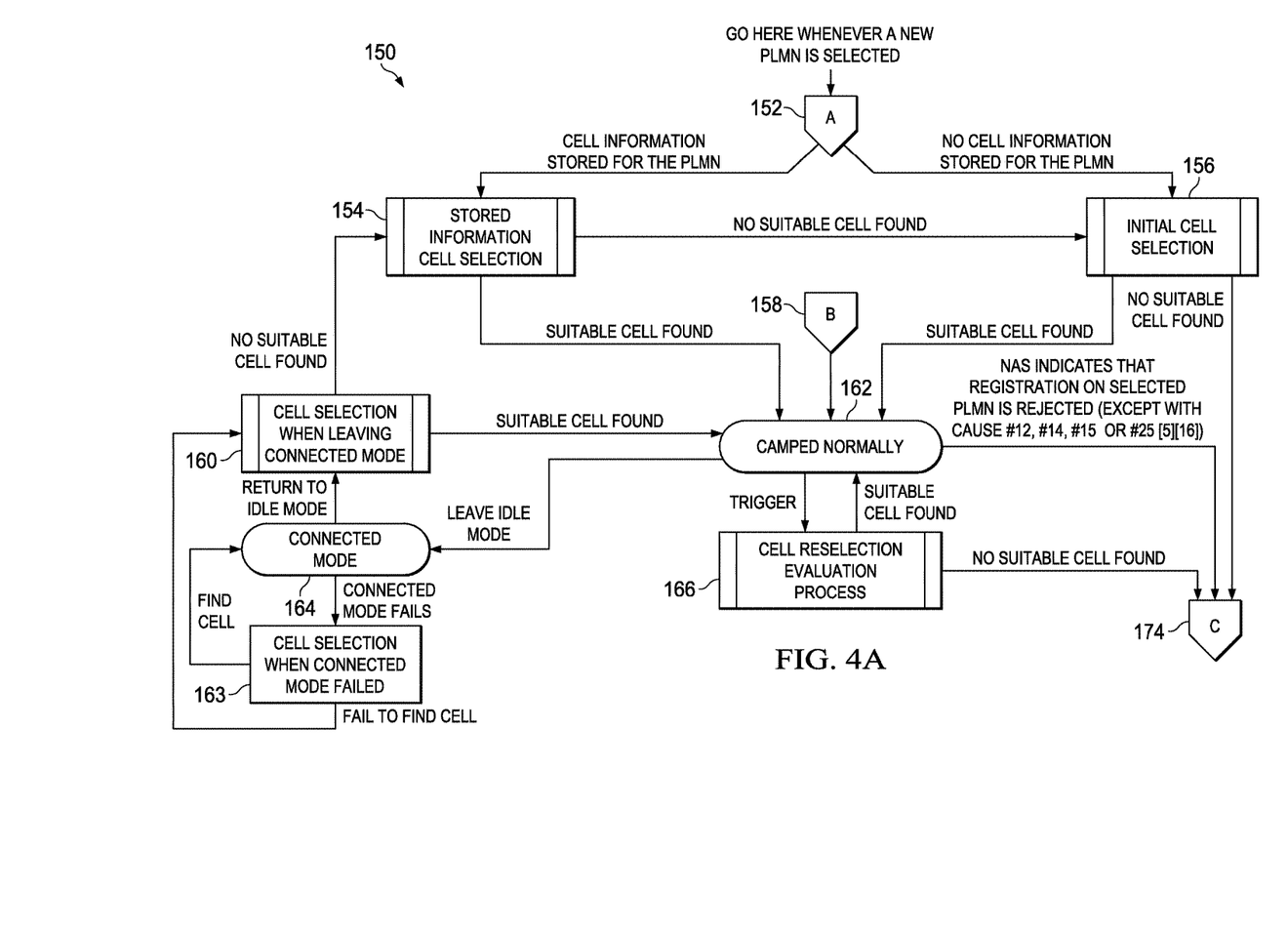
FIGS. 4A-B illustrate an idle mode cell selection and reselection state diagram.
Figure 4B:
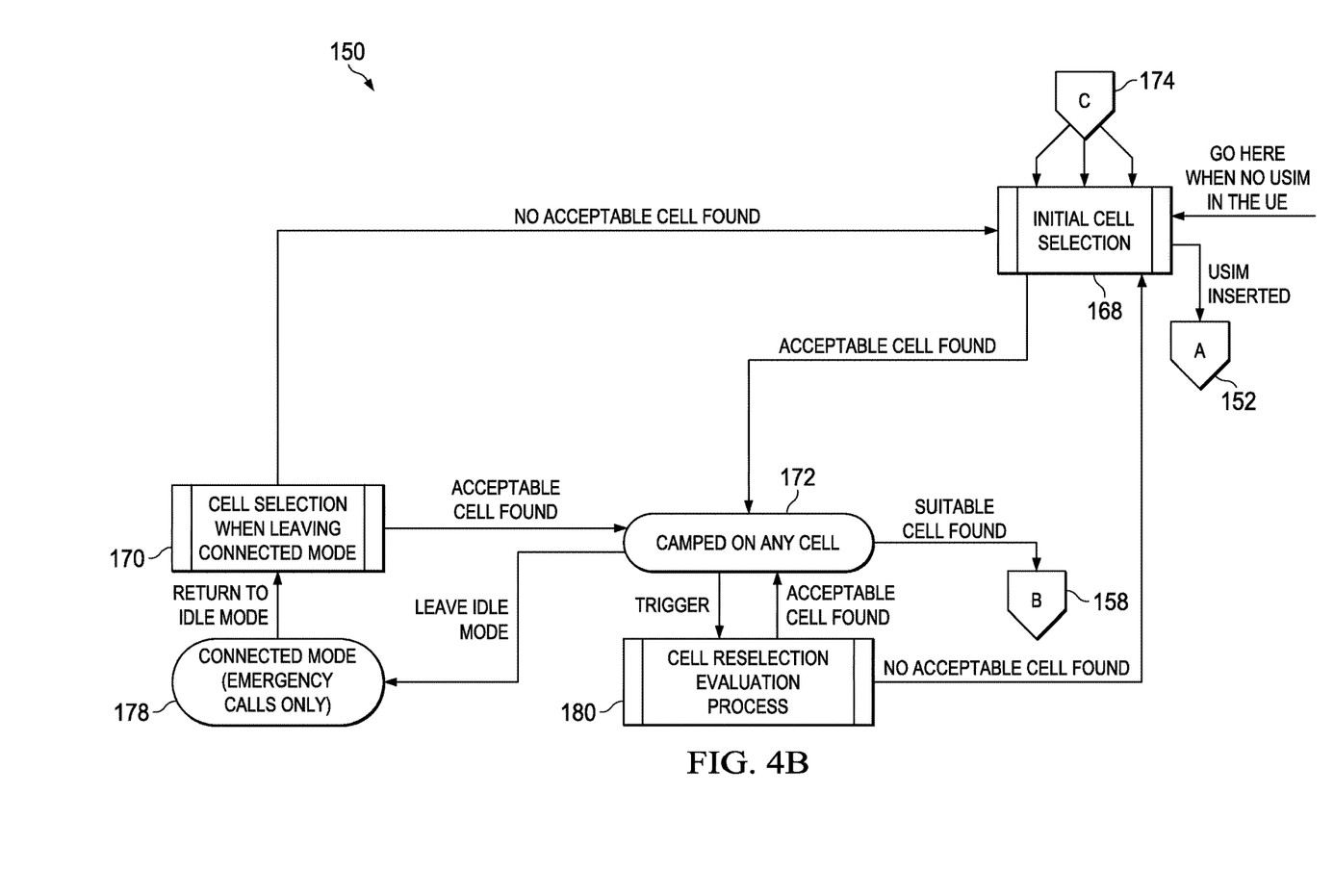

FIGS. 4A-B illustrate state diagram 150 for idle cell selection and reselection. When a new PLMN selection is performed, the UE goes to state 152.

Initial cell selection is performed in initial cell selection state 156. Prior knowledge of which radio frequency (RF) channels are evolved universal mode telecommunications system (UMTS) terrestrial radio access network (E-UTRA) carriers is not required. The UE scans the RF channels in the E-UTRA bands to find a suitable cell. On each carrier frequency, the UE only searches for the strongest cell. When a suitable cell is found, it is selected, and the UE proceeds to camped normally state 162. When no suitable cell is found, the UE proceeds to any cell selection state 168 via state 174.

In stored information cell selection state 154, stored information of carrier frequencies and optionally information on cell parameters from previously received measurement control information elements or from previously detected cells is used. When the UE has found a suitable cell, the UE selects it, and proceeds to camped normally state 162. When no suitable cell is found, the UE proceeds to initial cell selection state 156.

In camped normally state 162, the UE is camped on an eNB. While the UE is in the camped normally state, it has only dedicated priorities, and the UE considers the current frequency to be the lowest priority frequency. When the UE is in camped normally state 162, and it leaves idle mode, it goes to connected mode 164. When the UE receives a trigger, it proceeds to cell reselection evaluation process state 166. When NAS indicates that the registration on the selected PLMN has been rejected, it proceeds to any cell selection state 168 through state 174.

In connected mode 164, the UE operates in connected mode. The UE communicates with the eNB.

Then, when the UE returns to idle mode, it proceeds to cell selection when leaving idle mode state 160. When a suitable cell is found, the UE proceeds to camped normally state 162. When no suitable cell is found, the UE proceeds to information cell selection state 154. When the connected mode fails, it proceeds to cell selection when connected mode failed state 163.

In cell selection when connected mode failed state 163, the UE performs cell selection. When the UE is able to connect to a cell, either a new cell or the cell it was previously connected to, it returns to connected mode 164. On the other hand, when the UE is not able to connect to a cell, it proceeds to cell selection when leaving connected mode state 160.

In cell reselection evaluation process state 166, cell reselection evaluation is performed. When a suitable cell is found, either a new cell or the cell the UE was previously connected to, the UE returns to camped normally state 162. On the other hand, when no suitable cell is found, the UE proceeds to any cell selection state 168 via state 174.

In any cell selection state 168, the UE attempts to find an acceptable cell of any PLMN to camp on, trying all RATs supported by the UE and searching first for a high quality cell. When universal subscriber identity module (USIM) is inserted, the UE proceeds to state 152. On the other hand, when an acceptable cell if found, the UE proceeds to camped on any cell state 172.

In camped on any cell state 172, the UE selects and monitors the indicated paging channels of the cell and monitors relevant system information. Also, the UE performs measurements for the cell reselection evaluation procedure. Additionally, the UE proceeds to the cell reselection evaluation process state 180 on UE internal triggers or when information on the broadcast control channel (BCCH) used for the cell reselection evaluation procedure has been modified. The UE regularly attempts to find a suitable cell trying all frequencies of all RATs supported by the UE. When a suitable cell is found, the UE proceeds to camped normally state 162 via state 158. When the UE supports voice services and the current cell does not support emergency calls, the UE performs cell selection/reselection to an acceptable cell of any supported RAT regardless of priorities provided in system information from the current cell when no suitable cell is found. When the UE leaves idle mode, it proceeds to connected mode emergency calls only state 178.

In cell reselection evaluation process state 180, reselection priorities are handled. When an acceptable cell is found, the UE returns to camped on any cell state 172. On the other hand, when no acceptable cell is found, the UE proceeds to any cell selection state 168.

In connected mode emergency calls only state 178, the UE only takes emergency calls. When the UE returns to idle mode, it proceeds to cell selection when leaving connected mode state 170.

In cell selection when leaving connected mode state 170, the UE performs cell selection. When an acceptable cell is found, the UE proceeds to camped on any cell state 172. When no acceptable cell is found, the UE proceeds to any cell selection state 168.

Embodiments include both in-network and out-of network coverage. When a UE is in-coverage, it receives scheduled resources for D2D communication transmissions from the network. When the UE is in out-of-network coverage, it uses a contention based scheme to select air interface resources for D2D transmission. A UE is considered to be in coverage when the UE is in an connected mode, camped in a suitable cell, is in connected mode, or satisfies an in-coverage threshold. On the other hand, a UE is in out-of-network coverage when in the UE is out-of-coverage. A UE may be considered to be out of coverage when it was previously in coverage and has lost coverage, is in cell selection when connected mode failed state, camped on any cell, or does not satisfy the in-coverage threshold.

An in-coverage threshold (ICT) is:

$$ICT = Q_{rxlevmeas} - (Q_{rxlevmin} + Q_{D2Doffset}) - Pcompensation$$

where ICT is the in-coverage threshold in decibels (dB), $Q_{rxlevmeas}$ is the measured reference signal received power (RSRP) from the serving or camping cell, $Q_{rxlevmin}$ is the minimum required reception level in the cell in dBm, $Q_{D2Doffset}$ is the offset used for D2D communications determinations, and Pcompensation is the maximum of max $(P_{EMAX} - P_{PowerClass}, 0)$ in dB. $P_{EMAX}$ is the maximum transmission power level a UE may use when transmitting on the uplink cell in dBm and $P_{PowerClass}$ is the maximum RF output of the UE in dBm in accordance with the UE power class. These values may be computed or measured on a per-subframe basis. Alternatively, these values are computed on another time granularity, such as by slot or radio frame. In another example, they are determined in irregular intervals. When $Q_{rxlevmeas}$ cannot be defined, it may be set to minus infinity or another value, such as an arbitrary low value.

$Q_{D2Doffset}$ is transmitted by eNBs supporting D2D communications. For example, $Q_{D2Doffset}$ is transmitted in a system information block (SIB) defining the parameters for D2D communication. When $Q_{D2Doffset}$ is not received from the eNB, for example because the UE is out of coverage or the eNB does not transmit it, $Q_{D2Doffset}$ is a fixed value pre-configured in the UE, which may be specified, for example, by a standard. In one example, the default value of $Q_{D2Doffset}$ is 3 dB.

A set of subframes $S_{meas}$ is defined, where $S_{meas}$ is the set of subframes on which ICT is measured. For example, $S_{meas}$ may be the set of N consecutive subframes, where N is transmitted in a SIB or pre-configured when an SIB is not received. In another example, N is predefined, for example defined by a standard. Alternatively, $S_{meas}$ is any set of N subframes chosen by the UE within a time T, where N and T are transmitted in an SIB, pre-configured, or predefined.

The maximum ICT value over the set of subframes is:

$$ICT_{max} = \max\{ICT(s), s \in S_{meas}\}.$$

In one example, $ICT_{max}$ is computed on a single subframe, and $ICT_{max} = ICT$. The criterion to be in coverage may be:

$$ICT_{max} \geq ICT_{Th},$$

where $ICT_{Th}$ is a threshold which may be predefined, for example from a standard specification, broadcasted by the network in an SIB, or a fixed predefined value. When:

$$ICT_{max} < ICT_{Th},$$

the UE is determined to be out-of-coverage.

The criterion:

$$ICT_{max} \geq ICT_{Th}$$

is based on the fact that, when, during a given time, a single ICT value is measured larger than the threshold, the device is considered out-of-coverage. This provides extra protection for the cellular network, and, to some extent, and when in doubt, determines that the UE is in coverage. In another example, another criteria is used, for example, the minimum ICT value over the set of subframes is used, for example:

$$ICT_{min} \geq ICT_{Th},$$

where:

$$ICT_{min} = \min\{ICT(s), s \in S_{meas}\}.$$

In another example, the average ICT value over the set of subframes is used:

$$ICT_{avg} \geq ICT_{Th},$$

where:

$$ICT_{avg} = \frac{1}{K} \sum_{s \in S_{meas}} ICT(s),$$

and K is the number of subframes is $S_{meas}$.

In additional examples, other criteria, such as the harmonic mean or geometric mean, may be used.

In another example, two in-coverage thresholds, ICTs and ICTb are used. ICTs is used for obtaining the scheduling grants or only D2D broadcast resources, and ICTb is used only for discovery. In one example, ICTb is more useful for idle UEs. ICTs and ICTb are calculated similarly to ICT, with different D2D offsets, where:

$$Q_{D2Doffset\_B} Q_{D2Doffset\_S},$$

and:

$$0 \leq Q_{D2Doffset\_S}.$$

The UE will not start registration to the cell even when it has successfully detected a cell and decoded the master information block (MIB) and SIBs unless:

$$Srxlev = (Q_{rxlevmeas} - (Q_{rxlevmin} + Q_{rxlevminoffset}) - Pcompensation) \geq 0.$$

A quality reference signal received quality (RSRQ) type threshold for in-coverage is:

$$INC\_Qual = Q_{qualmeas} - (Q_{qualmin} + Q_{qualD2Doffset}).$$

However, the quality threshold may not be used when the serving cell of the D2D UE makes provisions for D2D resources, such as making them orthogonal to resources assigned to cellular information. The SIB may indicate the value of $Q_{qualD2Doffset}$. A default value of $Q_{qualD2Doffset}$ may be $+\infty$. The UE may need to satisfy the S-Criteria to obtain D2D resource allocation commands from the eNB, unless the commands are broadcast, for example in an SIB.

In one situation, an ICT or $ICT_{max}$ may be greater than zero, but the UE only finds an acceptable cell where only emergency calls are allowed. In such a case, depending on the UE category, the UE may be considered to be in or out of network from a D2D perspective, and use the corresponding resource allocation method. For example, public safety UEs may be considered to be in-network, while an ordinary UE would be considered to be out-of-network.

When the ICT or $ICT_{max}$ is greater than zero, but the cell is a barred cell, D2D service may not be allowed until another cell is found, unless the UE is a public safety UE. When the UE is a public safety UE, a contention based scheme may be adopted. In another example, the cell provides a pool of resources to UEs in a broadcast message, and the UE performs contention-based transmission using the broadcast resource pool.

When no RSRP is measured, the cell is out-of-coverage from a D2D perspective. However, it may be in the coverage of another RAT. The UE is considered to have out-of-network coverage.

In another embodiment, out-of-network coverage is defined when the UE is in the any cell selection state, i.e. the UE is searching for a cell to camp on, but cannot find one. In another embodiment, out-of-network coverage is defined when the UE was previously in connected mode and lost coverage. There may be some default resource or band the UE may use for D2D in the any cell selection state, for example preprogrammed or defined by the network during the last registration. However, this may be limiting, for example to public safety uses. For example, in the camped on any cell state, it is likely that a public safety UE should also be allowed to use D2D on the default band or resource, or another band or resource indicated by the network in an SIB message.

The network may also provide a timer to the UE for how long it may access these resources once it goes out of coverage. The eNB may update this out-of-coverage D2D resource allocation on a relatively dynamic basis. For example, the eNB may eliminate it when there is no emergency incident necessitating D2D communication, and the UE is in the camped normally state and the connected mode state.

In an embodiment, a UE assesses whether it is in-coverage or not using an ICT computation. When the UE is in-coverage, it uses a first resource assignment method, where the eNB schedules the D2D communication. When the UE is out-of-coverage, the D2D UE obtains its resource allocation through a contention based resource allocation method.

Figure 5:
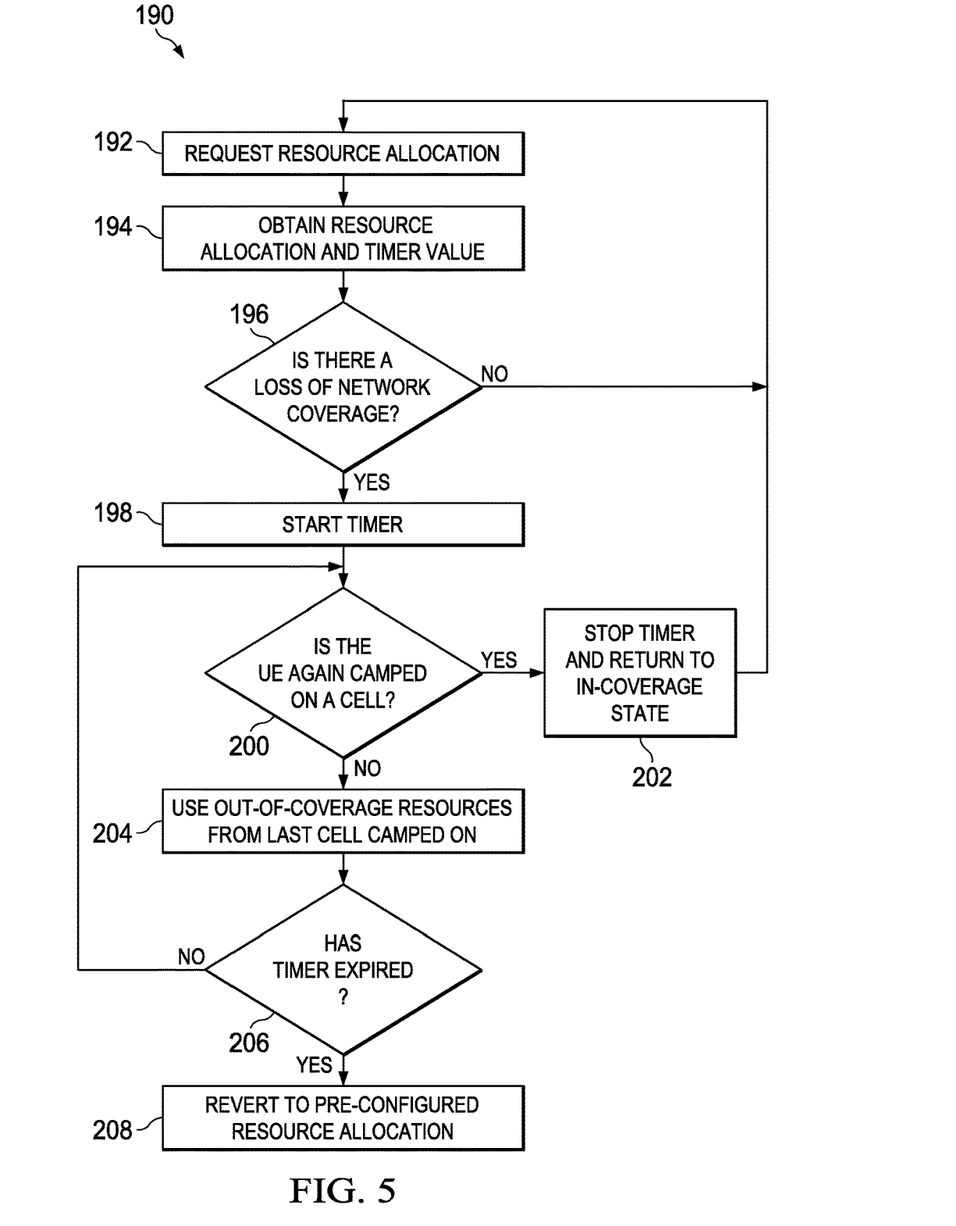
FIG. 5 illustrates a flowchart for an embodiment method of device-to-device (D2D) resource allocation.

FIG. 5 illustrates flowchart 190 for a method of D2D communication. The UE decides D2D resource allocation using a timer. Initially, in step 192, the UE requests resource allocation from an eNB while in-coverage. The UE connects to the eNB to request its D2D resource allocation.

Next, in step 194, the UE obtains the resource allocation and/or a timer value from the eNB. In one embodiment, the UE reads the appropriate SIB and obtains the current value for out-of-coverage D2D resource allocation and the timer value for this cell. The UE stores the resource allocation and/or a timer value. When these values have changed, the UE updates them.

Then, in step 196, the UE determines whether there is a loss of network coverage. When the UE loses coverage, it performs cell selection/reselection, and it is no longer camped on a cell. When there is no loss of coverage, the UE returns to step 192 to request resource allocation again. When the UE detects a loss of network coverage, it proceeds to step 198.

In step 198, the UE starts a timer. For example, the timer may be initialized to the timer value stored from the last cell it camped on received in step 194. The timer counts down from the timer value. In another example, the timer value is predetermined.

In step 198, the UE uses the out-of-coverage resources from the cell it camped on in step 194 for D2D communications. The UE continues to use these resources while the timer has not expired and the UE is not camped on or connected to a cell.

In step 200, the UE determines whether it is camped on or connected to a cell again. The UE may be camped on or connected to the same cell or another cell. This may be the same cell it was previously camped on or a totally new cell. When the UE is camped on and connected to a cell, it proceeds to step 202. On the other hand, when the UE has still not camped and connected to a cell, it proceeds to step 204.

In step 202, the UE stops the timer and returns to the in-coverage state. The UE uses scheduling-based D2D resources from the eNB on which it is camped. The UE returns to step 192 to request resource allocation while in coverage.

In step 204, the UE uses out-of coverage resources obtained from the last cell it was connected to or camped on.

Then, in step 206, the UE determines whether the timer has expired. When the timer has not expired, the UE returns to step 200 to determine whether the UE is camped on or connected to a new cell. When the timer has expired without camping on a new cell, the UE proceeds to step 208.

In step 208, the UE is out-of-coverage, for example in the any cell selection state. The UE stops using the out-of-coverage D2D resource from the last camped cell, and reverts back to using the pre-configured out-of-contact resource allocation. The UE may use contention-based D2D resources.

Figure 6:
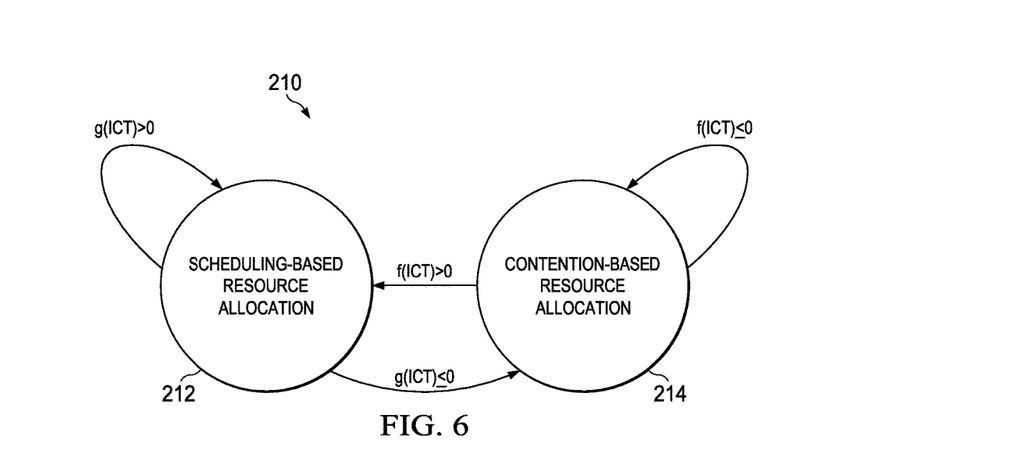
FIG. 6 illustrates an embodiment state diagram for D2D resource allocation.

FIG. 6 illustrates state diagram 210 with scheduling-based resource allocation state 212 and contention-based resource allocation state 214. In scheduling-based resource allocation state 212, the UE is camped on a cell, and performs scheduling-based resource allocation. When the UE is in scheduling-based resource allocation state 212, it computes g(ICT) and determines if g(ICT) is greater than zero. For example, g(ICT) may be equal to $ICT_{max}-ICT_{Th}$, $ICT_{min}-ICT_{Th}$, or $ICT_{avg}-ICT_{Th}$. When g(ICT) is greater than zero, the UE remains in scheduling-based resource allocation state 212. On the other hand, when g(ICT) is less than or equal to zero, the UE proceeds to contention-based resource allocation state 214.

In contention-based resource allocation state 214, the UE is not camped on a cell, and performs contention-based resource allocation. The UE calculates f(ICT) in contention-based resource allocation state 214, and determines whether f(ICT) is less than or equal to zero. When f(ICT) is less than or equal to zero, the UE remains in contention-based resource allocation state 214. When f(ICT) is greater than zero, the UE proceeds to scheduling-based resource allocation state 212. In one example, and g(ICT)=f(ICT)+d, where d is an offset. The offset d is used to avoid repeatedly switching back and forth between contention-based resource allocation and scheduling-based resource allocation The UE remains in scheduling-based resource allocation state 212 as long as g(ICT)>0, even when it cannot obtain scheduling information.

Figure 7:
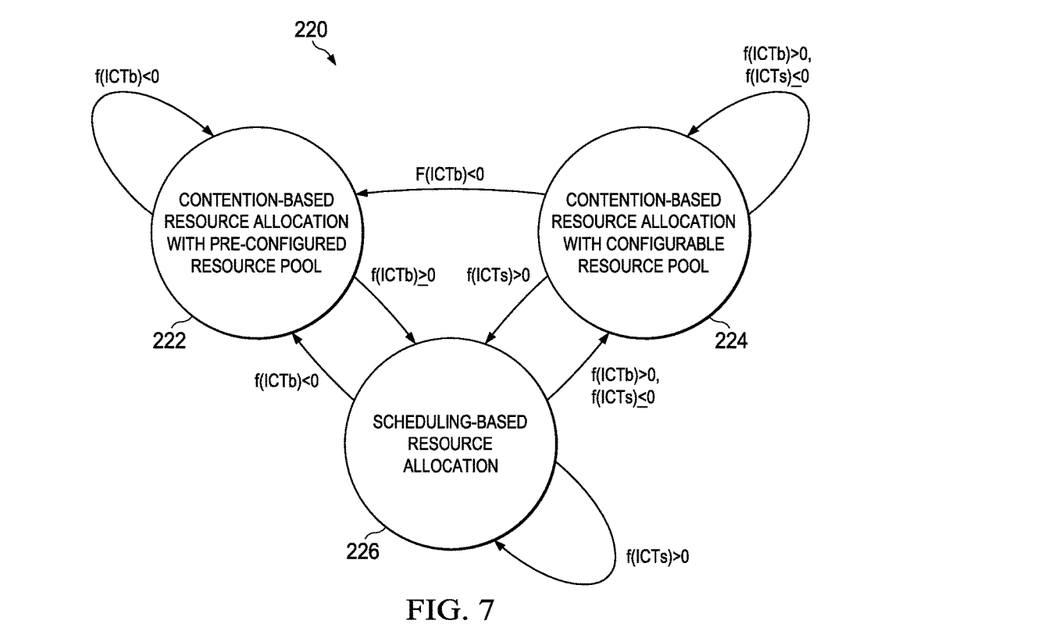
FIG. 7 illustrates another embodiment state diagram for D2D resource allocation.

FIG. 7 illustrates resource allocation state diagram 220, which contains contention-based resource allocation with pre-configured resource pool state 222, scheduling based resource allocation state 226, and contention-based resource allocation with configurable resource pool state 224. In contention-based resource allocation with pre-configured resource pool state 222, the UE is not camped on a cell and has never been in coverage. The UE performs contention-based resource allocation with a pre-configured resource pool. The UE determines f(ICTb), which may be $ICT_{max}-ICT_{Th}$, $ICT_{min}-ICT_{Th}$, or $ICT_{avg}-ICT_{Th}$. While f(ICTb) is less than zero, the UE remains in contention-based resource allocation with pre-configured resource pool state 222. When f(ICTb) is greater or equal to zero, the UE proceeds to the scheduling-based resource allocation state 226.

In contention-based resource allocation with configurable resource pool state 224, the UE has previously been camped on a cell, and has come out of coverage. The UE performs contention-based resource allocation with a configurable resource pool. The UE determines f(ICTs) and f(ICTb). When f(ICTs) is greater than zero, the UE proceeds to scheduling-based resource allocation state 226. When f(ICTb) is greater than zero and f(ICTs) is less than or equal to zero, the UE remains in contention-based resource allocation with configurable resource pool state 224. When f(ICTb) is less than zero, the UE proceeds to the contention-based resource allocation with pre-configured resource pool state 222.

In scheduling-based resource allocation state 226, the UE performs scheduling-based resource allocation while it is camped on a cell. The UE calculates f(ICTb) and f(ICTs). When f(ICTb) is less than zero, the UE proceeds to contention-based resource allocation with pre-configured resource pool state 222. When f(ICTs) is greater than zero, the UE remains in scheduling based resource allocation state 226. When f(ICTb) is greater than zero and f(ICTs) is less than or equal to zero, the UE proceeds to contention-based resource allocation with configurable resource pool state 224.

Figure 8:
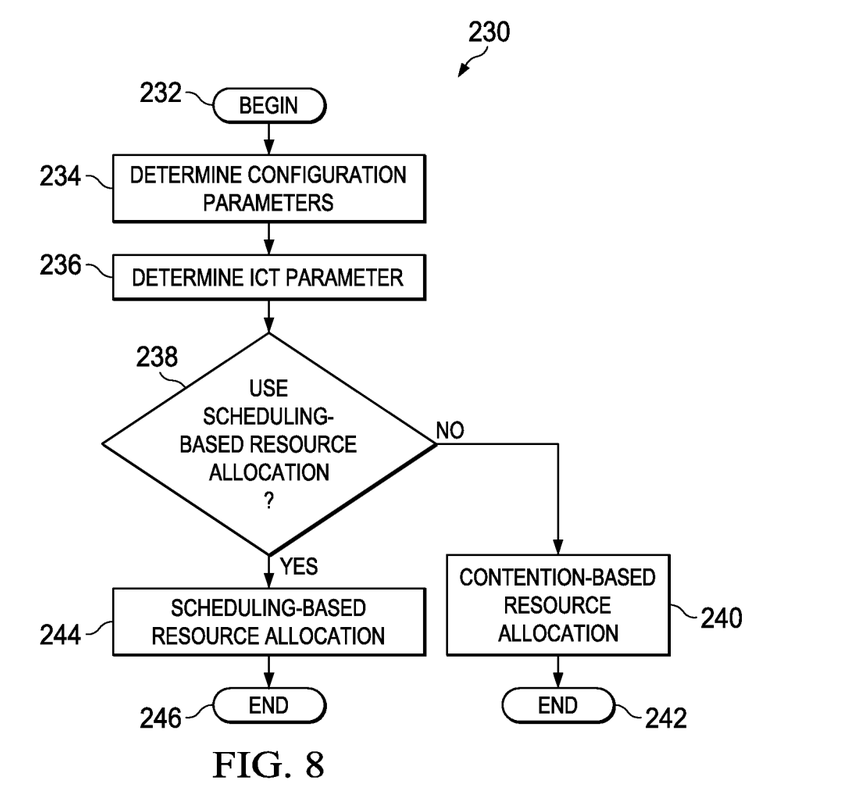
FIG. 8 illustrates a flowchart for another embodiment method of D2D resource allocation.

FIG. 8 illustrates flowchart 230 for an embodiment method of deciding between contention based D2D resource allocation or schedule-based D2D resource allocation.

$ICT_{max}$, $ICT_{min}$, $ICT_{avg}$, or another ICT parameter may be used. Initially, in step 232, the UE begins the procedure.

Next, in step 234, the UE obtains configuration information. The configuration information is used to calculate the in-coverage criteria. In one example, the in-coverage criteria are specified in the third generation project protocol (3GPP) specification. Alternatively, the in-coverage criteria are manually preconfigured. In another example, the in-coverage criteria are conveyed to the UE by another means, for example by receiving a message from a eNB, for example in the SIB. The UE obtains the parameters for computing the ICT, as well as the threshold for determining the resource allocation method (scheduling-based or contention-based).

After obtaining the configuration parameters, the UE computes the ICT parameters in step 236, such as ICT and $ICT_{max}$, $ICT_{min}$ and/or $ICT_{avg}$. In one example, ICT and $ICT_{max}$ are computed periodically, so the UE bases its decision to use either a contention based or scheduling based resource allocation policy with current information. The periodicity may be known a priori or obtained in step 234. Alternatively, the computation is performed at irregular intervals. The ICT is:

$$ICT = Q_{rxlevmeas} - (Q_{rxlevmin} + Q_{D2Doffset}) - Pcompensation.$$

$ICT_{max}$ is:

$$ICT_{max} = \max\{ICT(s), s \in S_{meas}\}.$$

In one example, $ICT_{max}$ is computed on a single subframe, and $ICT_{max} = ICT$.

In step 238, the UE decides whether to use scheduling-based resource allocation or contention based resource allocation based on the ICT parameters. In other examples, other variables, such as ICT, are used. For example, the UE may compare $ICT_{max}$ to the ICT threshold. In one example, when:

$$ICT_{max} \geq ICT_{Th},$$

the UE determines that the UE is in-coverage, and uses scheduling-based resource allocation in step 244. On the other hand, when:

$$ICT_{max} < ICT_{Th},$$

the UE determines that it is out-of-coverage, and uses contention-based resource allocation in step 240. In other examples, $ICT_{min}$ or $ICT_{avg}$ is used instead of $ICT_{max}$. $ICT_{Th}$ is a threshold which may be predefined, for example from a standard specification, broadcasted by the network in an SIB, or a fixed predefined value.

In step 244, the UE performs scheduling-based resource allocation. The UE requests D2D resources from the network, for example from the eNB. The network then grants a resource to the UE for D2D transmission. In one example, the UE is in RRC_Connected mode, and may use the RACH. After step 244, the UE proceeds to step 246, and ends the procedure.

In step 240, the UE uses contention based resource allocation. For example, the UE may perform transmission with a contention-based approach relying on the CSMA protocol used in international electrical and electronics engineers (IEEE) 802.11, or another contention-based mechanism. After step 240, the UE proceeds to step 242 and ends this procedure.

The UE may notify the receivers of whether it is using scheduling or contention-based resource allocation. When the UE uses scheduled resources, and the allocation is performed semi-statically, it may be desirable for the receivers to know, so they can monitor this set of resources. For example, the receiver may want to avoid a discontinuous reception (DRX) like mode. The transmitting UE may broadcast a scheduling message to all potential receivers, where the transmitter indicates the resource allocation for the actual data transmission. A field to indicate for how long this set of resources is valid for this transmitter may also be indicated in the broadcast message.

In addition to the in-coverage case and out-of-coverage case, there may be a partial coverage case. In one example of partial-coverage, the UE cannot communicate directly with the eNB, but is attempting to communicate with a UE which is in coverage. In one example, with partial coverage, the resource allocation is contention-based. In another example, contention-based resource allocation is used, but the resource pool is pre-configured, with a priori knowledge by the two UEs communicating D2D. This may reduce the UEs interfering with the eNB. In an additional example, the resource allocation is scheduling-based, and the in-coverage UE relays the grant to the out-of-coverage UE.

Figure 9:
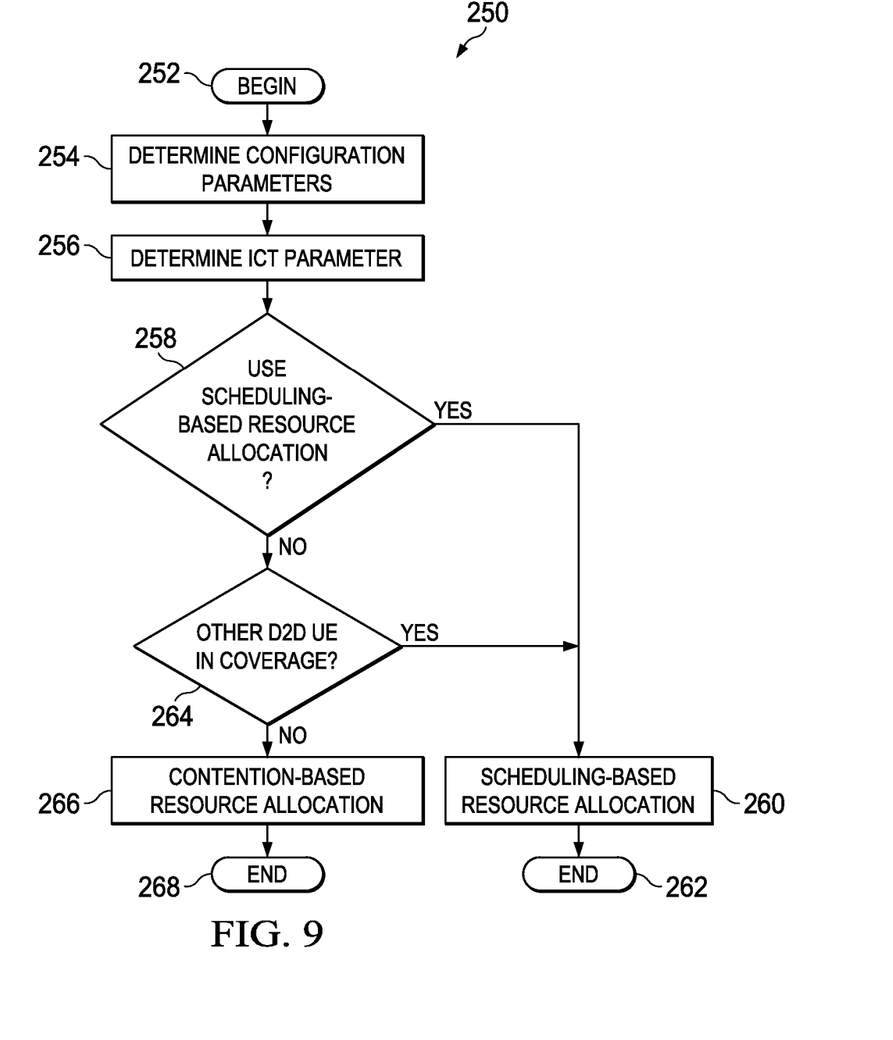
FIG. 9 illustrates a flowchart for an additional embodiment method of D2D resource allocation.

FIG. 9 illustrates flowchart 250 for a method of determining resource allocation when scheduling-based resource allocation is used for partial coverage. Initially, in step 252, the UE begins the procedure.

Then, in step 254, the UE obtains configuration information. The configuration information is used to calculate the in-coverage criteria. In one example, the in-coverage criteria are specified in the third generation project protocol (3GPP) specification. Alternatively, the in-coverage criteria are manually preconfigured. In another example, the in-coverage criteria are conveyed to the UE by another means, for example by receiving a message from a eNB, for example in the SIB. The UE obtains the parameters for computing the ICT, as well as the threshold for determining the resource allocation method (scheduling-based or contention-based).

Next, after obtaining the configuration parameters, the UE computes the ICT parameters in step 256, such as ICT and $ICT_{max}$, $ICT_{min}$ and/or $ICT_{avg}$. In one example, ICT and $ICT_{max}$ are computed periodically, so the UE bases its decision to use either a contention based or scheduling based resource allocation policy with current information. The periodicity may be known a priori or obtained in step 234. Alternatively, the computation is performed at irregular intervals. The ICT is:

$$ICT = Q_{rxlevmeas} - (Q_{rxlevmin} + Q_{D2Doffset}) - Pcompensation.$$

$ICT_{max}$ is:

$$ICT_{max} = \max\{ICT(s), s \in S_{meas}\}.$$

In one example, $ICT_{max}$ is computed on a single subframe, and $ICT_{max} = ICT$.

In step 258, the UE decides whether it is in coverage or out of coverage. In other examples, other variables, such as ICT, are used. For example, the UE may compare $ICT_{max}$ to the ICT threshold. In one example, when:

$$ICT_{max} \geq ICT_{Th},$$

the UE determines that the UE is in-coverage, and uses scheduling-based resource allocation in step 244. On the other hand, when:

$$ICT_{max} < ICT_{Th},$$

the UE determines that it is out-of-coverage, and uses contention-based resource allocation in step 240. In other examples, $ICT_{min}$ or $ICT_{avg}$ is used instead of $ICT_{max}$. $ICT_{Th}$ is a threshold which may be predefined, for example from a standard specification, broadcasted by the network in an SIB, or a fixed predefined value.

In step 264, the UE determines whether the other UE with which it wants to perform D2D communications is in coverage. For example, this determination may be performed by using different discovery signals for out-of-coverage UEs. When the other UE is in coverage, the UE proceeds to step 260 to perform scheduling based resource allocation. On the other hand, when the other UE is also out of coverage, the UE proceeds to step 266 to perform contention based resource allocation.

In step 260, the UE performs scheduling-based resource allocation. When only one UE is in coverage, the out-of-coverage UE may blindly rely on grant requests and grant responses from and to the in-coverage UE, which communicates directly with the eNB. In another example, the out-of-coverage UE decodes the grant request from the in-coverage UE, aggregates the grant response with its grant requests, and transmits a single grant request to the eNB. Then resources are allocated to the out-of-coverage UE based on the received grant from the eNB. When both UEs are in-coverage, both UEs directly communicate with the eNB. After step 260, the UE proceeds to step 262, and ends the procedure.

In step 266, the UE uses contention based resource allocation. For example, the UE may perform transmission with a contention-based approach relying on the CSMA protocol used in international electrical and electronics engineers (IEEE) 802.11, or another contention-based mechanism. After step 266, the UE proceeds to step 268 and ends this procedure.

In one example, an in-coverage UE may move to out-of-coverage or partial coverage. The UE notifies the UE it is communicating with of its change of status. In another example, an out-of-coverage UE moves to in-coverage. In this example, the UE stops the contention-based transmission to avoid interference on the cellular resources. The UE moving into coverage immediately suspends the D2D communication and notifies the communicating UE of its change of status.

Some techniques may be used to avoid rapidly switching back and forth between in-coverage and out-of-coverage. A hysteresis mechanism may be used with a different threshold for moving into coverage and moving out of coverage. In another example, when the UE has switched, it may be prevented from switching again for a given duration.

Because a UE moving into coverage may interfere with the eNB, these mechanisms may only be used for switching out of coverage. For example, when a timer is used, the timer may be set to 0 seconds for switching from in-coverage to out-of-coverage. When hysteresis is used, the thresholds may be such that there is no penalty for switching out-of-coverage, so the hysteresis essentially only applies for out-of-coverage UEs.

Figure 10:
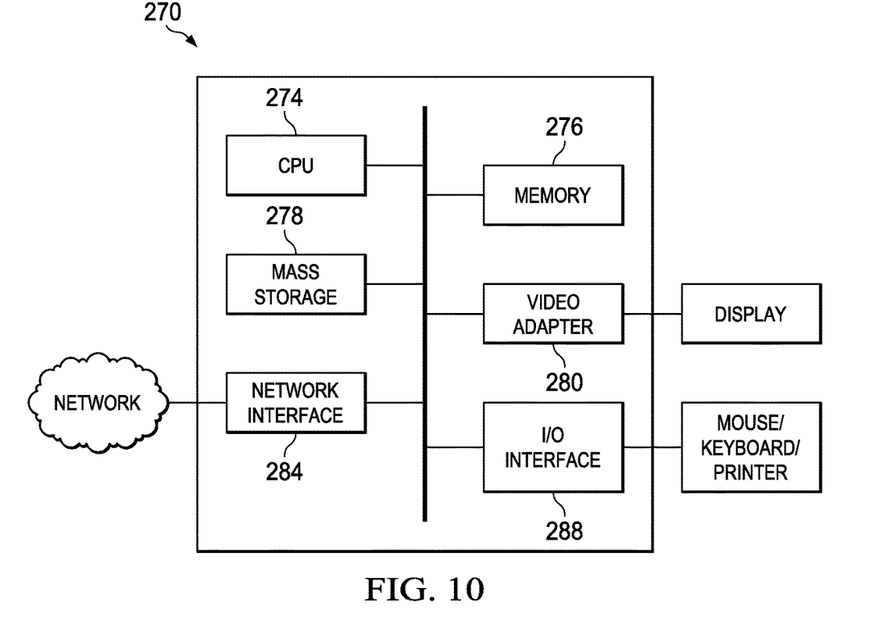
FIG. 10 illustrates a block diagram of an embodiment computer system.

FIG. 10 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adaptor 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for device-to-device (D2D) communication, the method comprising:
   determining that a first user equipment (UE) is out-of-coverage of a first cell, the first UE having been previously in-coverage of the first cell;
   starting a timer for utilizing a first D2D resource by the first UE for a D2D communication upon determining that the first UE is out-of-coverage of the first cell, the first D2D resource being allocated for D2D communications of UEs that are out-of-coverage of the first cell, and the first D2D resource being accessible by the first UE before the timer expires;
   communicating, by the first UE directly with a second UE, using the first D2D resource, upon determining that the timer has not expired and the first UE has not returned to be in-coverage; and
   performing, by the first UE, D2D communications using a second resource when determining that the timer has expired; and
   wherein the method further comprises:
   requesting, by the first UE from the first cell, a resource allocation while the first UE is in-coverage on the first cell; and receiving, by the first UE from the first cell, resource allocation information;
   wherein receiving the resource allocation information comprises receiving the resource allocation on a system information block (SIB); and
   wherein starting the timer comprises:
      setting the timer to a timer value; and
      counting down the timer from the timer value to zero.

2. The method of claim 1, wherein performing, by the first UE, the D2D communications using the second resource when determining that the timer has expired further comprises performing the D2D communications using contention-based resource allocation when the timer has expired.

3. The method of claim 2, wherein the contention-based resource allocation comprises using a random access channel (RACH).

4. The method of claim 2, wherein the contention-based resource allocation comprises using carrier sensing multiple access (CSMA).

5. The method of claim 1, further comprising stopping the timer when the first UE has returned to be in-coverage.

6. The method of claim 1, further comprising communicating, by the first UE directly with the second UE, using in-coverage resources from a second cell when the first UE has returned to be in-coverage on the second cell.

7. The method of claim 1, further comprising communicating, by the first UE directly with the second UE, using in-coverage resources from the first cell when the first UE has returned to be in-coverage on the first cell.

8. The method of claim 1, further comprising:
   requesting, by the first UE from the first cell, a resource allocation while the first UE is in-coverage on the first cell; and
   receiving, by the first UE from the first cell, resource allocation information after requesting the resource allocation.

9. The method of claim 8, wherein the resource allocation information comprises in-coverage resource allocation information.

10. The method of claim 8, wherein the resource allocation information comprises out-of-coverage resource allocation information.

11. The method of claim 1, further comprising receiving, by the first UE from the first cell, a timer value while the first UE is in-coverage on the first cell.

12. The method of claim 1, wherein determining that the first UE is out-of-coverage comprises determining that the first UE is not camped normally.

13. The method of claim 1, wherein determining whether the first UE has returned to be in-coverage comprises determining whether the first UE is camped normally.

14. A user equipment (UE) comprising:
   a processor; and
   a non-transitory computer readable storage medium storing programming for execution by the processor, the programming including instructions to:
      determine that the UE is out-of-coverage of a first cell, the UE having been previously in-coverage of the first cell,
      start a timer for utilizing a first D2D resource by the first UE for a D2D communication upon determining that the UE is out-of-coverage of the first cell, the first D2D resource being allocated for D2D communications of UEs that are out-of-coverage of the first cell, and the first D2D resource being accessible by the first UE before the timer expires,
      communicate, directly with a second UE, using the first D2D resource, upon determining that the timer has not expired and the UE has not returned to be in-coverage,
      determine that the timer has expired, and
      perform D2D communications using a second resource upon determining that the timer has expired; and
   wherein the method further comprises:
   requesting, by the first UE from the first cell, a resource allocation while the first UE is in-coverage on the first cell; and receiving, by the first UE from the first cell, resource allocation information;
   wherein receiving the resource allocation information comprises receiving the resource allocation on a system information block (SIB); and
   wherein starting the timer comprises:
      setting the timer to a timer value; and
      counting down the timer from the timer value to zero.

15. The UE of claim 14, wherein the instructions further comprise instructions to communicate, with the second UE, using contention-based resource allocation when the timer has expired.

16. The UE of claim 14, wherein the instructions further comprise instructions to stop the timer when the UE has returned to be in-coverage.

17. The UE of claim 14, wherein the instructions further comprise instructions to communicate, directly with the second UE, using in-coverage resources from a second cell when the UE has returned to be in-coverage on the second cell.

18. The UE of claim 14, wherein the instructions further comprise instructions to communicate, directly with the second UE, using in-coverage resources from the first cell when the UE has returned to be in-coverage on the first cell.

19. The UE of claim 14, wherein the instructions further comprise instructions to:
   request, from the first cell, a resource allocation while the UE is in-coverage on the first cell; and
   receive, from the first cell, resource allocation information after requesting the resource allocation.

20. A non-transitory computer readable storage medium storing programming for execution by a processor of a first user equipment (UE), the programming including instructions to:
- determine that the first UE is out-of-coverage of a first cell, the first UE having been previously in-coverage of the first cell;
- start a timer for utilizing a first D2D resource by the first UE for a D2D communication upon determining that the first UE is out-of-coverage of the first cell, the first D2D resource being allocated for D2D communications of UEs that are out-of-coverage of the first cell, and the first D2D resource being accessible by the first UE before the timer expires;
- communicate, directly with a second UE, using the first D2D resource, upon determining that the timer has not expired and the first UE has not returned to be in-coverage;
- determine that the timer has expired; and
- receive D2D data using a second resource, upon determining that the timer has expired; and wherein the method further comprises:
requesting, by the first UE from the first cell, a resource allocation while the first UE is in-coverage on the first cell; and receiving, by the first UE from the first cell, resource allocation information;
wherein receiving the resource allocation information comprises receiving the resource allocation on a system information block (SIB); and
wherein starting the timer comprises:
- setting the timer to a timer value; and
- counting down the timer from the timer value to zero.

* * * * *